(12) United States Patent
Yagil et al.

(10) Patent No.: US 10,581,647 B2
(45) Date of Patent: *Mar. 3, 2020

(54) SYNCHRONIZED INTERFERENCE SUPPRESSION IN FREQUENCY DOMAIN

(71) Applicant: Capacicom Ltd., Kfar Neter (IL)

(72) Inventors: Ariel Yagil, Ein Sarid (IL); Naor Goldman, Zoran (IL); Avihay Sadeh, Tel Aviv (IL); Ronen Mayrench, Raanana (IL); Daniel Wajcer, Beit Yehoshua (IL)

(73) Assignee: CAPACICOM LTD., Kfar Neter (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,038

(22) Filed: Apr. 11, 2019

(65) Prior Publication Data

US 2019/0238371 A1 Aug. 1, 2019

Related U.S. Application Data

(63) Continuation of application No. 15/907,289, filed on Feb. 28, 2018, now Pat. No. 10,305,706.

(60) Provisional application No. 62/465,193, filed on Mar. 1, 2017.

(51) Int. Cl.
*H04B 15/00* (2006.01)
*H04L 25/03* (2006.01)
*H04B 3/23* (2006.01)

(52) U.S. Cl.
CPC ......... *H04L 25/03159* (2013.01); *H04B 3/23* (2013.01)

(58) Field of Classification Search
CPC .............. H04B 3/32; H04B 1/707; H04B 2001/71077; H04B 3/23; H04L 25/03343; H04L 25/038121; H04L 5/1461; H04L 25/03159
USPC ....... 375/285, 144, 148, 346, 347, 348, 354; 455/307; 370/252, 328
See application file for complete search history.

(56) References Cited

U.S. PATENT DOCUMENTS

| 10,305,706 B2 * | 5/2019 | Yagil | H04B 3/23 |
| 2013/0072143 A1 * | 3/2013 | Dabiri | H03H 21/0012 455/307 |
| 2018/0131502 A1 * | 5/2018 | Askar | H04B 1/1027 |

* cited by examiner

*Primary Examiner* — Khai Tran
(74) *Attorney, Agent, or Firm* — Kligler & Associates Patent Attorneys Ltd

(57) ABSTRACT

An apparatus for communication includes a transmission chain, an interference suppressor and a reception chain. The transmission chain is configured to transmit a transmitted signal. The interference suppressor is configured to produce suppression signals, by filtering reference signals drawn from the transmission chain. At least one of the reference signals is filtered in a frequency domain. The reception chain is configured to receive a signal distorted by at least an attenuated and delayed replica of the transmitted signal. The transmitted signal and the received signal are (i) synchronized in time and (ii) each includes one or more subcarriers selected from a common subcarrier-resource. The reception chain is further configured to process the received signal up to selected points, to subtract the suppression signals from the received signal at the selected points to produce an interference-suppressed signal, and to recover data carried in the received signal from the interference-suppressed signal.

13 Claims, 5 Drawing Sheets

SYNCHRONIZED INTERFERENCE SUPPRESSION IN FREQUENCY DOMAIN

CROSS-REFERENCE TO RELATED APPLICATIONS

This application claims the benefit of U.S. Provisional Patent Application 62/465,193, filed Mar. 1, 2017, whose disclosure is incorporated herein by reference.

TECHNICAL FIELD

Embodiments described herein relate generally to communication systems, and particularly to methods and systems for efficient interference suppression.

BACKGROUND

In various wired and wireless communication systems the performance of a receiver is degraded by interfering signals originating from a transmitter. Methods for suppressing such interference are known in the art. For example, U.S. Pat. No. 7,672,447 describes an echo canceller that reduces an echo signal produced when the transmitted signal leaks back into the receiver via a hybrid. The echo canceller estimates the echo signal from the transmitted signal, and then the estimated echo signal is subtracted from the received signal. In practice, the echo path channel in a DMT-modem is much longer than the cyclic prefix, and therefore, the received echo signal will be subjected to both ISI (inter-symbol-interference) and ICI (inter-carrier-interference). A traditional echo canceller, designed for a xDSL-modem, uses either a time domain adaptive FIR-filter or a combined echo canceller implemented in both time and frequency domain. A matrix-based adaptive echo canceller is implemented in the frequency domain.

U.S. Patent Application Publication 2017/0237492 describes achieving full duplex bidirectional transmission across coaxial cable in a hybrid fiber-coaxial cable TV network. Some preferred systems and methods will attenuate reflections propagated within the coaxial cable. Other preferred systems may echo-cancel reflections propagated within the coaxial cable.

U.S. Patent Application Publication 2017/0019241 describes a communication system comprising a media access control (MAC) scheduler in a cable network, and a full band transceiver. The MAC scheduler implements a two-dimensional transmission-reception (T-R) coordination scheme among a plurality of cable modems in the cable network. The cable modems are categorized into interference groups for facilitating full duplex communication in the cable network across the frequency range. The full band transceiver implements an adaptive interference cancellation scheme, which suppresses at a receiver a signal transmitted by a transmitter.

An international telecommunications standard, referred to as "Data Over Cable Service Interface Specification" (DOCSIS) that was developed by CableLabs and contributing companies, specifies the transfer of high-bandwidth data over existing cable TV (CATV) systems. In 2017, a Full Duplex (FDX) version of DOCSIS version 3.1 has been announced, in which at least part of the spectrum of the cable plant can be used simultaneously in both upstream and downstream directions. The physical layer of the DOCSIS 3.1 standard, including FDX, is specified, for example, in Annex F of the specifications "Data-Over-Cable Service Interface Specifications DOCSIS® 3.1, Physical Layer Specification," CM-SP-PHYv3.1-I13-171220, December 2017.

SUMMARY

An embodiment that is described herein provides an apparatus for communication that includes a transmission chain, an interference suppressor and a reception chain. The transmission chain is configured to transmit a transmitted signal. The interference suppressor is configured to produce one or more suppression signals, by filtering one or more respective reference signals drawn from the transmission chain. At least a given reference signal of the one or more reference signals is filtered in a frequency domain. The reception chain configured to receive a received signal distorted by an interference signal including at least an attenuated and delayed replica of the transmitted signal. The transmitted signal and the received signal are (i) synchronized in time and (ii) each includes one or more subcarriers selected from a common subcarrier-resource. The processing chain is further configured to process the received signal up to one or more selected points along the reception chain, to respectively subtract the one or more suppression signals from the received signal at the selected points to produce an interference-suppressed signal and to recover data carried in the received signal from the interference-suppressed signal.

In some embodiments, the transmission chain includes a digital TX sub-chain followed by an analog TX sub-chain, and each of the one or more reference signals is drawn from the digital TX sub-chain or from the analog TX sub-chain. In other embodiments, the reception chain includes an analog RX sub-chain followed by a digital RX sub-chain, and each of the selected points along the reception chain is included in the analog RX sub-chain or in the digital RX sub-chain. In yet other embodiments, the transmission chain and the reception chain are configured to operate in a full duplex mode.

In an embodiment, the interference suppressor is configured to generate an analog suppression signal based on a digital reference signal drawn from a digital sub-chain of the transmission chain. In another embodiment, the interference suppressor is configured to generate, using time-domain filtering, an analog suppression signal for suppressing at least noise or distortion interference, and to generate, using frequency-domain filtering, a digital suppression signal for suppressing interference caused by leakage or reflections of the transmitted signal. In yet another embodiment, the transmission chain is configured to split the transmitted signal into multiple signal-copies for transmission over multiple respective ports, the reception chain is configured to combine multiple reception signals received from the respective ports, and the interference suppressor is configured to generate a suppression signal based on respective samples of the multiple signal-copies.

In some embodiments, the interference suppressor is configured to generate for the multiple signal-copies multiple respective temporary suppression signals, and to generate the suppression signal by summing the multiple temporary suppression signals. In other embodiments, the interference suppressor is configured to generate the temporary suppression signals by applying to each of the signal-copies a time-domain or a frequency-domain filtering operation. In yet other embodiments, the interference suppressor is configured to generate the suppression signal for reducing a level of at least noise or distortion present at the multiple signal-copies.

In an embodiment, the interference suppressor is configured to subtract a first suppression signal from the received signal at a first point of the reception chain, and to subtract a second suppression signal at a second different point of the reception chain for reducing a residual interference signal present in the received signal after subtracting the first suppression signal at the first point. In another embodiment, the transmission chain and the reception chain are configured to operate in accordance with a DOCSIS full duplex specification. In yet another embodiment, the transmission chain is configured to transmit the transmitted signal over a coaxial-based network of a Cable TV (CATV) system, and the reception chain is configured to receive the received signal over the coaxial-based network of a Cable TV (CATV) system.

There is additionally provided, in accordance with an embodiment that is described herein, a method for communication including transmitting a transmitted signal by a transmission chain. One or more suppression signals are produced, by filtering one or more reference signals drawn from the transmission chain. At least a given reference signal of the one or more reference signals is filtered in a frequency domain. A received signal is received in a reception chain, the received signal is distorted by an interference signal including at least an attenuated and delayed replica of the transmitted signal. The transmitted signal and the received signal are (i) synchronized in time and (ii) each includes one or more subcarriers selected from a common subcarrier-resource. The received signal is processed up to one or more selected points along the reception chain, and the one or more suppression signals are subtracted from the received signal at the respective selected points to produce an interference-suppressed signal. Data carried in the received signal is recovered from the interference-suppressed signal.

These and other embodiments will be more fully understood from the following detailed description of the embodiments thereof, taken together with the drawings in which:

DETAILED DESCRIPTION OF EMBODIMENTS

Overview

Figure 1:
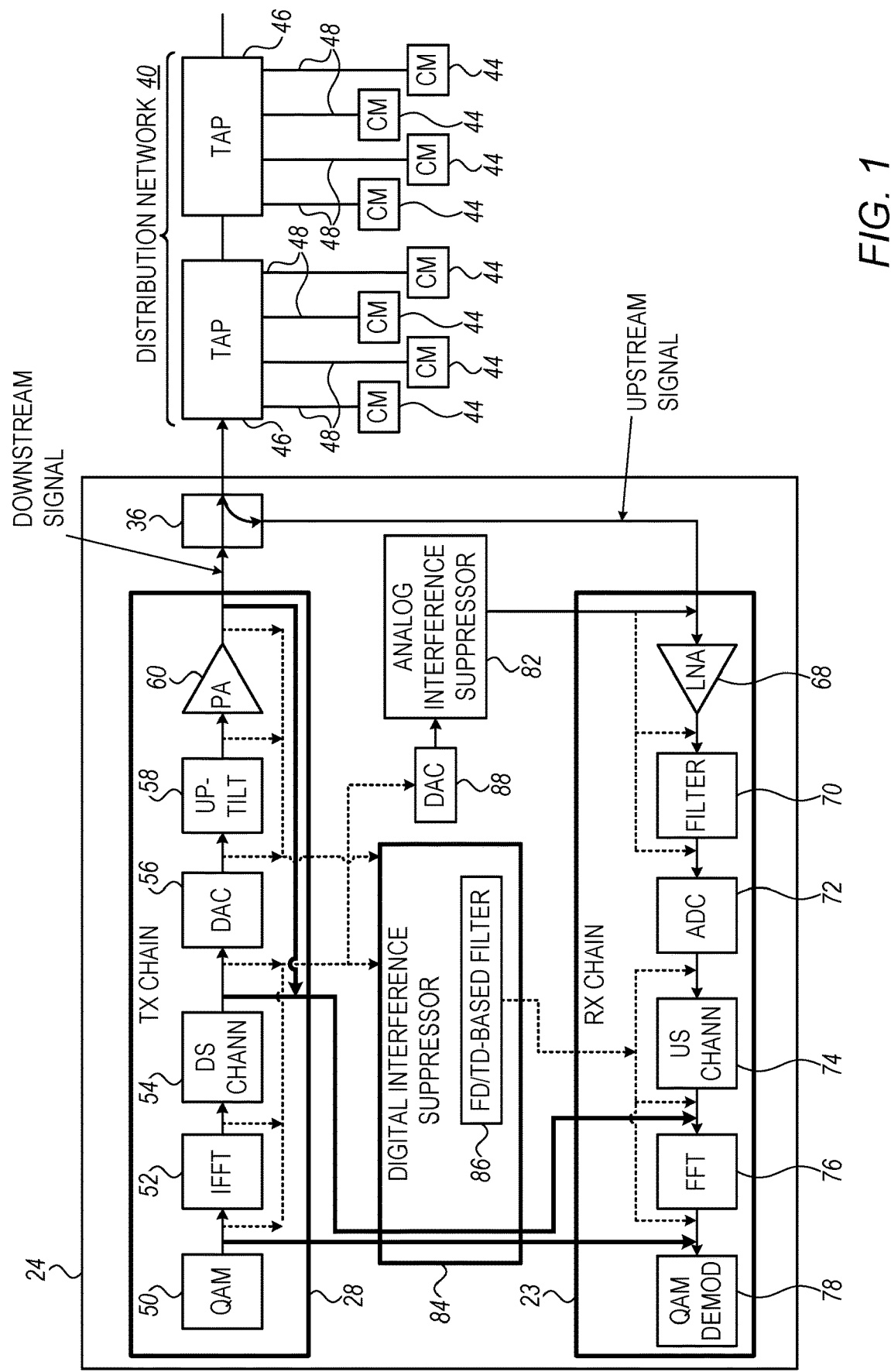
FIG. 1 is a block diagram that schematically illustrates a transceiver operating in a communication system, in accordance with an embodiment that is described herein.

Embodiments that are described herein provide improved methods and systems for interference suppression in a communication system.

A transceiver is a communication apparatus comprising a transmitter and a receiver. For example, in a cable TV headend, a transceiver may communicate bi-directionally with end users equipped with Cable Modems (CMs) over a wire communication network.

Since the signal transmitted by the transmitter is much stronger than the signal received at the receiver, a portion of the transmitted signal typically leaks to the receiver, e.g., due to imperfect isolation. The transmitted signal may also interfere with the received signal, by being reflected back to the receiver from an antenna or a wire connector at the transmitter output, or by various elements of the communication network. Other interference sources include thermal noise, quantization noise due to conversion between analog and digital signals, and nonlinear distortion caused mainly by power amplifiers.

Signal reflections are typically caused due to imperfect impedance matching at the point of reflection. In a wireless network, reflections may also be caused by a multipath channel. In the present context, the term "reflection" refers to an attenuated and delayed replica of the transmitted signal. The term "reflection" is also referred to as "echo."

The interfering signal is typically weaker than the originating transmitted signal, but its level is sufficiently high, compared to the received signal, to degrade the receiver performance.

One approach to avoid transmitter-to-receiver interference is to use a Time Division Duplexing (TDD) or Frequency Division Duplexing (FDD) scheme, i.e., separate between transmission and reception in time or frequency, respectively. This approach however fails to fully exploit time/frequency resources of the bi-directional communication channel.

The FDX DOCSIS 3.1 standard cited above specifies a full-duplex mode over part of the cable-plant spectrum (also referred to as the FDX Band.) In some disclosed embodiments, for achieving acceptable receiver performance in the full duplex mode, interference caused to the receiver is canceled or suppressed, as will be described in detail below.

In some embodiments, the transmitter comprises a transmission chain that processes the transmitted signal, and the receiver comprises a reception chain that processes the received signal. The transceiver additionally comprises an interference suppressor that emulates an interference channel between a TX reference point along the transmission chain and a RX reference point within the reception chain, at which the suppression signal is subtracted to produce an interference-suppressed signal. The receiver recovers data carried in the received signal from the interference-suppressed signal. The interference suppressor generates the suppression signal by filtering the reference signal in the time domain, in the frequency domain or both, as will be described below.

In some embodiments, for efficient frequency-domain implementation of interference suppression in an Orthogonal Frequency-Division Multiplexing (OFDM) signals transceiver, the transmitted OFDM signal and the received OFDM signal are (i) synchronized in time and (ii) each comprises one or more subcarriers selected from a common subcarrier-resource.

The TX (or RX) reference point can be any suitable point selected in a digital sub-chain or in an analog sub-chain of the transmission (or reception) chain. In some embodiments, the interference suppressor generates two or more suppression signals based on two or more respective reference signals, and each of the suppression signals is subtracted at a respective RX reference point.

In one embodiment, the interference suppressor filters the reference signal in the time domain using a convolution operation. In another embodiment, the impulse response of the interference channel is long, and the interference suppressor efficiently filters the reference signal in the frequency domain, as will be described below.

In an embodiment, the interference suppressor applies frequency-domain filtering by converting the reference signal to the frequency domain using Fast Fourier Transform (FFT), multiplying the frequency domain signal by a frequency response function of the interference channel, and converting the result back to the time domain using Inverse FFT (IFFT). In practical applications, frequency-domain filtering may be on the order of thirty times more efficient than time-domain filtering. Depending on the selection of the TX and RX reference points, one of the FFT and IFFT operations, or both, can be eliminated to further reduce the computational load.

In some embodiments, the transceiver synchronizes between the transmitter and receiver so that the FFT block at the receiver contains echoes corresponding to only a single transmitted OFDM symbol. In such embodiments, frequency-domain filtering can be applied efficiently with no overlapping between successive FFT blocks.

In some embodiments, the transmission chain transmits multiple signal-copies of the transmitted signal over multiple respective ports (or legs). In such embodiments, a different echo may be received from each leg. Thus, the reception chain combines multiple reception signals received via the respective ports at the front-end of the reception chain. To suppress echoes related to the transmitted signal, the interference suppressor generates a single suppression signal based on the sum of the reflections of all or some of the multiple signal-copies. To suppress noise and distortion interference, the interference suppressor generates for the multiple signal-copies multiple respective temporary suppression signals, and produces the suppression signal by summing the multiple temporary suppression signals. The interference suppressor may generate the temporary suppression signals using time-domain or frequency-domain filtering.

In some embodiments, the interference suppressor generates the suppression signal for reducing a level of at least noise and distortion present at the multiple signal-copies. The interference suppressor subtracts the suppression signal from the received signal at a first point of the reception chain, and subtracts another suppression signal at a second different point of the reception chain for reducing a residual interference signal present in the received signal after subtracting the suppression signal at the first point.

In the disclosed embodiments, interference suppression techniques are applied to improve the receiver performance when operating in a full duplex mode. In an efficient implementation, the suppression of echo interference is carried out using efficient frequency-domain filtering and the suppression of noise and distortion interference is carried out using time-domain filtering. The disclosed techniques result in reduced computational load, and reduced power consumption.

System Description

FIG. 1 is a block diagram that schematically illustrates a transceiver 24 operating in a communication system, in accordance with an embodiment that is described herein. In the present example, transceiver 24 operates in a cable TV (CATV) communication system, e.g., in a headend or node that distributes content to multiple subscribers and/or provides bidirectional access to the Internet. Alternatively, transceiver 24 may operate in any other suitable communication system such as a wireless communication system.

Further alternatively, transceiver 24 may be implemented at the end device side, e.g., in a cable modem or in a wireless mobile device.

Transceiver 24 comprises a transmitter 28 and a receiver 32 that are both coupled to a coupling device 36. The coupling device receives downstream signals from the transmitter and transmits them to a distribution network 40. Coupling device 36 additionally receives upstream signals from the distribution network and forwards the upstream signals to the receiver.

In the example of FIG. 1, distribution network 40 comprises a wired-based distribution network that allows bidirectional communication between transceiver 24 and remote subscriber devices such as Cable Modems (CMs) 44. Alternatively or additionally, any other suitable subscriber devices such as set top boxes (not shown) that are compliant with the DOCSIS specifications can also be used, e.g., in Internet Protocol TV (IPTV) applications. In the present example, distribution network 40 is a wired network comprising taps 46 interconnected using coax cables. In the present example, each tap 46 connects to four respective CMs via respective drop cables 48.

A tap receiving a downstream signal from transceiver 24, forwards a portion of the downstream signal to each of its interconnected CMs via respective drop cables 48, and possibly to a successive tap. A tap receiving an upstream signal from a CM via a drop cable, or from another tap, forwards the upstream signal to the transceiver possibly via one or more additional taps.

In alternative embodiments, distribution network 40 may comprise any suitable communication network such as a wireless network or a combination of a wireless network and a wired-based network.

In the example of FIG. 1, transceiver 24 transmits signals modulated using an Orthogonal Frequency-Division Multiplexing (OFDM) scheme, and receives signals modulated using an Orthogonal Frequency-Division Multiple Access (OFDMA) scheme. For example, transceiver 24 may communicate OFDM signals in accordance with the FDX DOCSIS 3.1 standard cited above. Alternatively, any other suitable modulation technique can also be used.

Transmitter 28 processes signals for transmission using a transmission chain (also denoted TX chain) that comprises several elements as described herein. A QAM modulator 50 receives a stream of input bits (not shown) and maps the input bits into QAM symbols, in accordance with a predefined QAM constellation that comprises up to several thousands of constellation points (e.g., 16K-QAM). Alternatively, any other suitable mapping of bits to modulation symbols, e.g., BPSK modulation, can also be used. An Inverse Fast Fourier Transform (IFFT) module 52 transforms the QAM symbols into an OFDM signal that modulates multiple subcarriers. In accordance with the FDX DOCSIS 3.1 standard cited above, the nominal sample rate at the IFFT output is 204.8 MHz, and the IFFT block size may be 4096 or 8192 samples, corresponding to subcarrier spacing of 50 kHZ and 25 KHz, respectively. The downstream bandwidth may be limited to 192 MHz. The OFDM signal resulting by applying one operation of the IFFT module corresponds to one OFDM symbol.

The transmitter applies to the OFDM signal at the output of IFFT module any suitable shaping window such as a raised cosine window (not shown). In some embodiments, the transmitter adds to the OFDM symbol a Cyclic Prefix (CP) extension, i.e., a copy of the last Ncp points of the OFDM symbol at the beginning of the same OFDM symbol (not shown). The addition of the CP enables the receiver at the CM side to overcome Inter Symbol Interference (ISI).

A downstream (DS) channelizing module 54 receives the OFDM signal after the addition of the CP and windowing, and up-converts the OFDM signal from baseband to a selected channel within the FDX bandwidth.

A Digital to Analog Converter (DAC) 56 converts the OFDM signal into an analog form. In some embodiments, the TX chain comprises an up-tilt equalizer 58 that emphasizes high frequencies of the downstream signal to achieve an approximately flat frequency response over the used bandwidth at the CMs' inputs. The up-tilted downstream signal is amplified by a Power Amplifier (PA) and transmitted to the distribution via coupling device 36.

In the reception direction, an OFDMA upstream signal generated by a CM 44 is received via coupling device 36, amplified by a Low Noise Amplifier (LNA) 68, filtered by a receiver filter 70 and sampled and converted into a digital form using an Analog to Digital Converter (ADC) 72. Receiver filter 70 may comprise any suitable low-pass or bandpass filter, e.g., designed as a pre sampling filter. The upstream signal is then processed by an upstream (US) channelizing module 74, which down-converts the upstream signal to baseband. The receiver may apply to the down-converted signal a suitable shaping window, e.g., for reducing inter-carrier interference. The shaping window may be the same as or different from the shaping window applied in the TX chain. The output of US channelizing module 74 comprises OFDM symbols. The receiver removes the CP from the OFDMA symbols, and a Fast Fourier Transform (FFT) module 76 converts the OFDMA symbols into respective QAM symbols in one or more predefined constellations. A QAM demodulator 78 maps the QAM symbols into bits in accordance with the underlying constellations. Alternatively, other suitable constellations such as BPSK can also be used.

In the disclosed embodiments, transceiver 24 generally operates in a full duplex mode, i.e., one or more frequency subcarriers may be used simultaneously by both the transmitter and receiver. As such, the downstream signals transmitted by the transmitter may interfere with the upstream signals received by the receiver. To mitigate such interference, transceiver 24 comprises an analog interference suppressor 82, a digital interference suppressor 84, or both. During any time period, the transceiver may activate only analog interference suppressor 82, only digital interference suppressor 84, or both.

Analog interference suppressor 82 generates an analog suppression signal. The analog suppression signal can be subtracted from the received signal at any suitable RX reference point of the RX chain between the output of coupling device 36 and the input to ADC 72. In the present example, the receiver subtracts the analog suppression signal from the received signal at the output of coupling device 36, or equivalently the input of LNA 68, thus preventing LNA 68, ADC 72 or both from being saturated by the interfering signal. In the present example, the reference signal input to the analog interference suppressor is drawn from an element of the digital part of TX chain 28 such as QAM modulator 50, IFFT module 52 or DS channelizing module 54. A DAC 88 converts the reference signal to an analog form as input for analog interference suppressor 82. In alternative embodiments, the reference signal can be drawn from the analog part of TX chain 28, e.g., from the output of DAC 56, up-tilt equalizer 58 or PA 60, in which case DAC 88 is omitted.

Digital interference suppressor 84 receives a reference signal from a selected reference point within the TX chain. The reference signal may be drawn from a digital sub-chain of the TX chain comprising QAM modulator 50, IFFT module 52 and the DS channelizing module 54. Alternatively, an analog reference signal may be drawn from the analog sub-chain of the TX chain comprising DAC 56, up-tilt equalizer 58 and PA 60. The goal of digital interference suppressor 84 is to reduce the level of interference when analog interference suppressor 82 is omitted from the implementation or disabled, or to reduce the residual interference remaining after applying the analog interference suppressor, so as to meet a Signal-to-Interference-plus-Noise Ratio (SINR) requirement at the receiver.

The suppression signal generated by the digital interference suppressor can by subtracted from the received signal at any suitable RX reference point along the digital part of the RX chain after ADC 72. In the present example, the RX reference point can be the input to US channelizing module 74, FFT module 76 or QAM demodulator 78.

Digital interference suppressor 84 comprises an interference-emulating filter 86 that emulates the underlying interference channel. Depending on the selected TX reference point in the TX chain and on the RX reference point selected in the RX chain, digital interference suppressor 84 may additionally comprise one or more processing elements similar to respective elements of the TX or RX chain.

Example routes from selected TX reference points to RX reference points via the digital interference suppressor are depicted as bold lines in the figure. For example, when the TX reference signal is drawn from the output of PA 60 and the RX reference point is the input to FFT module 76, the digital interference suppressor comprises elements emulating a channel comprising LNA 68, receiver filter 70, ADC 72, US channelizing module 74, as well as coupling device 36 and distribution network 40 channels. As another example, when the TX reference signal is drawn from the output of DS channelizing module 54, and the RX reference point is the input to FFT module 76, the digital interference suppressor comprises channelizing module similar to US channelizing module 74 (not shown) and interference-emulating filter 86. The channelizing module of the digital interference suppressor receives samples of the full spectrum as input and reduces each of the US channels to baseband (the DOCSIS FDX specifications support up to six US channels). The interference-emulating filter convolves each of the baseband channels with the respective echo channel response. This echo channel emulates the physical channel between the TX reference point and the subtraction point. In this example, the echo channel response emulates the elements: DAC 56, up-tilt equalizer 58, PA 60, coupling device 36, relevant parts of distribution network 40, LNA 68, receiver filter 70, and US channelizing module 74.

As yet another example, when the TX reference signal is drawn from the output of QAM modulator 50, and the RX reference point is the input to QAM demodulator 78, no processing elements other than frequency-domain interference-emulating filter 86 are required.

Embodiments Implementing the Interference-Emulating Filter

In some embodiments, interference-emulating filter 86 comprises a digital Finite Impulse Response (FIR) filter whose time-domain (TD) coefficients emulate the impulse response function of the interference channel. In other embodiments, the interference-emulating filter 86 is represented by frequency-domain (FD) coefficients that emulate the frequency response function of the interference channel. Interference-emulating filter 86 emulates the interference channel between the TX reference point of the TX chain and the RX reference point for subtracting the estimated interference signal in the RX chain.

In the context of the present application and in the claims, the term "time-domain filtering" refers to a filtering operation that is based on a convolution operation with an impulse response function of the underlying interference channel. More generally, "time-domain filtering" refers to processing of time-domain samples of the TX reference signal and using time-domain representation of the interference channel, without transforming any of the TX reference signal and the interference channel representation to the frequency domain. Time-domain filtering can be implemented, for example, using a Finite Impulse Response (FIR) filter in which case the channel representation comprises the time-domain impulse response of the interference channel. Alternatively, time-domain filtering can be implemented using an Infinite Impulse Response (IIR) filter in which case the interference channel is represented using feed-forward and feed-backward coefficients. The term "frequency-domain filtering" refers to a filtering operation based on multiplication of a frequency domain representation of the TX reference signal by a frequency response function of the underlying interference channel.

Digital interference suppressor 84 can estimate the impulse response function or the frequency response function of the interference channel (i.e., the TD or FD coefficients of the filter) using any suitable method, e.g., data-aided estimation methods such as, for example, Least Mean Squares (LMS), Minimum Mean Square Error (MMSE), Recursive Least Squares (RLS) or Maximum Likelihood (ML) estimation. Estimating the interference channel can be carried out in parallel to receiving upstream signals, or during periods in which no upstream signals are transmitted by any of the remote CMs. In some embodiments digital interference suppressor 84 tracks time variations of the interference channel by re-estimating the interference channel periodically.

In an embodiment, interference-emulating filter 86 generates an interference suppression signal by applying a convolution operation between the estimated TD coefficients and samples of the TX reference signal, or a processed version of the TX reference signal by one or more chain elements as described above. The computational complexity of filtering using a convolution operation depends on the number of TD coefficients $N_{TD}$ required for representing the interference channel reliably, and on the sampling rate Fs used in the RX chain. In terms of Complex Multiply-and-Accumulate (CMAC) operations per second, the complexity is given by ($N_{TD}$·Fs) CMAC operations per second.

Consider, for example, an interference channel whose impulse response is 4 microseconds long. At a sampling rate of 100 MHz, the impulse response function of the interference channel is represented by $N_{TD}$=400 coefficients and the complexity of the digital interference suppressor is 40G CMACs/second.

In some embodiments, to reduce complexity, interference-emulating filter 86 applies filtering in the frequency domain (FD). In such embodiments, interference-emulating filter 86 is implemented using the FD coefficients representing the frequency response function of the interference channel, at the respective frequencies of the IFFT output. The interference-emulating filter converts the TX reference signal to the frequency domain using a FFT operation to produce a FD reference signal and multiplies the FD reference signal by the FD coefficients (i.e., an element-by-element multiplication) to produce a FD interference suppression signal.

In some embodiments, the signal at the TX reference point is given in the frequency domain (the input to IFFT module 52) and the FD interference suppression signal is subtracted in the frequency domain at the output of FFT module 76.

Let $N_{FFT}$ denote the FFT size used. The complexity of a single FFT (or IFFT) operation (assuming a radix-2 implementation) is given by $C_{FFT}$=[($N_{FFT}$/2)·$\log_2(N_{FFT})$] CMAC operations. The FD filtering complexity assuming subtraction in the frequency domain is thus given by (Fs/$N_{FFT}$)·[$N_{FFT}$+2·$C_{FFT}$]. For a 4K-FFT at a 100 MHz sample rate, the resulting complexity is (1e8/4096)·[4096+4096·12], or 1.3G CMACs/second. In some embodiments, FD filtering requires some block-overlapping, in which case the complexity is slightly higher than 1.3G CMACs/second. This computation is significantly more efficient than the 40G CMAC operations per second using a convolution operation as described above.

In some embodiments, the TX chain transmits OFDM downstream signals and the RX chain receives OFDMA upstream signals. In such embodiments, an equivalent FD filtering operation, in which only the frequency domain element-by-element multiplication is required by interference-emulating filter 86, can be applied by using the output of QAM modulator 50 as a TX reference point and the input to QAM demodulator 78 as a RX reference point, instead of taking (for example) the output of IFFT module 52 as a TX reference point and the input of FFT module 76 as the RX reference point, and filtering the TX reference signal using a convolution operation. This embodiment makes use of the IFFT and FFT operations that are already placed in the TX and RX chains for implementing the underlying OFDM scheme. The computational complexity in this embodiment (given Fs=100 MHz) is only 0.1G CMAC operations per second.

In some embodiments, a Cyclic Prefix (CP) is inserted per OFDM symbol. In such embodiments, implementing the FD filtering requires no overlapping between successive FFT blocks. Moreover, by skipping the CP intervals the computational complexity can be further reduced.

In some embodiments, the TX reference signal is drawn from the output of PA 60. In such embodiments, the interference channel includes noise and nonlinear distortion that appear at the PA output and cannot be compensated for when the TX reference point resides prior to PA 60. Assuming that the RX reference point is selected at the output of the FFT module, only one FFT operation to the sampled and digitized output of the PA is required. The computational complexity in this case is given by (Fs/$N_{FFT}$)·[$N_{FFT}$+$C_{FFT}$]. Using the parameters above results in (1e8/4096)·[4096+2048·12]=0.7G CMACs/second. Table 1 below summarizes several implementation options and related complexity. Note that in taking the CP into consideration, the complexity numbers depicted in Table 1 would be slightly lower.

TABLE 1

Interference-emulating filter implementation options and computational complexity

| Domain | Implementation option | CMACs/second |
|---|---|---|
| Time | Convolution | 40G |
| Frequency | FFT + IFFT + Multiplication | 1.3G |
| Frequency | FFT + Multiplication | 0.7G |
| Frequency | Multiplication only | 0.1G |

For efficient implementation of frequency-domain filtering in a transceiver that processes OFDM signals in both the downstream (TX) and upstream (RX) directions, the following four requirements apply, of which first three are related to a time-synchronization requirement between the receiver and transmitter:

1. The OFDM symbol time is the same for both the TX and RX directions. Since in full duplex the same bandwidth is shared for transmission and reception, an equivalent requirement is that the same OFDM subcarrier spacing should be used for both TX and RX directions.
2. The CP length is the same for both TX and RX directions.
3. The symbol timing in the TX chain and in the RX chain are inter-synchronized so that the interval over which the FFT module in the RX chain applies the FFT operation contains reflections originating from a single OFDM symbol transmitted by the TX chain.
4. The OFDM subcarriers in both the TX and RX directions share a common set of subcarriers on a predefined frequency grid. This grid of subcarriers is a predefined set of center frequencies from which the subcarrier frequencies of the US and DS are selected, also referred to in the present context and in the claims as a "common subcarrier-resource". This requirement ensures orthogonality between the subcarriers used for the US and DS directions.

Figure 2:
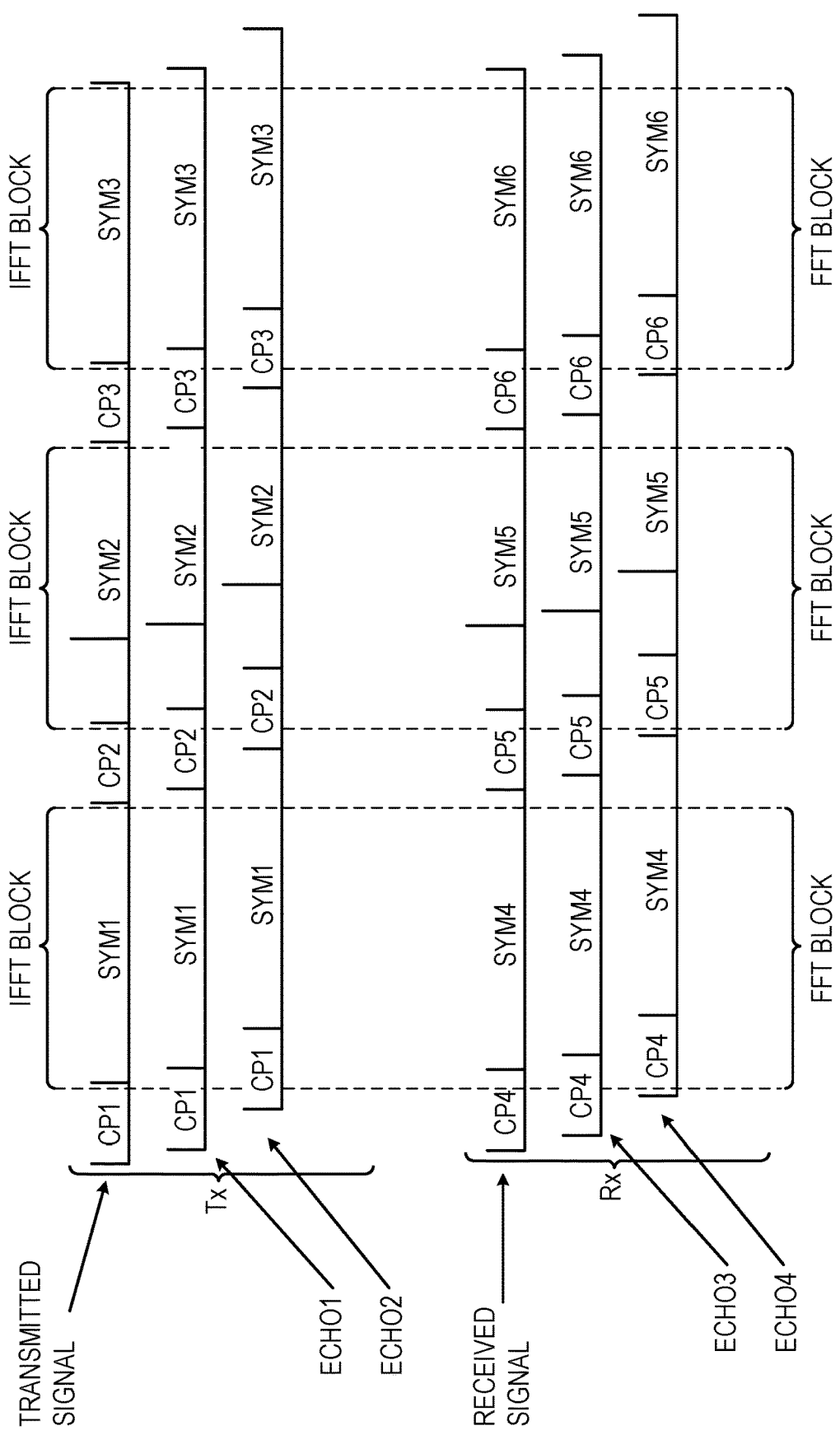
FIG. 2 is a diagram that schematically illustrates timing synchronization between transceiver TX chain and RX chain, in accordance with an embodiment that is described herein.

FIG. 2 is a diagram that schematically illustrates timing synchronization between TX chain and RX chain of a transceiver, in accordance with an embodiment that is described herein. The timing scheme is described with reference to transceiver 24 of FIG. 1, but is relevant also to transceiver 100 of FIG. 3 that will be described below.

In the example of FIG. 2, SYM1, SYM2 and SYM3 denote OFDM symbols transmitted by transmitter 28 of transceiver 24, whereas SYM4, SYM5 and SYM 6 denote OFDM symbols received by receiver 32 of transceiver 24. Each OFDM symbol includes a respective CP.

In the present example, the transmitted signal as well as echo signals of the transmitted signal denoted ECHO1 and ECHO2, reflected from the distribution network are received by the receiver as interference. In addition, the received signal as well as echoes ECHO3 and ECHO4 of the received signal are also present at the receiver input.

AS seen in the figure, the same symbol length and CP length are used for both TX and RX directions. In addition, the IFFT operation (IFFT block) in the TX chain and the FFT operation (FFT block) in the RX chain are time-synchronized so that echoes of only one transmitted OFDM symbol appear within each FFT block. For example, only echoes of SYM1 and CP1 fall within the FFT block applied to the received signal CP4 and SYM4. Consequently, circular convolution resulting by applying FD filtering is equivalent to a linear convolution in the time domain.

Multi-Leg Node with Interference Suppression

Figure 3:
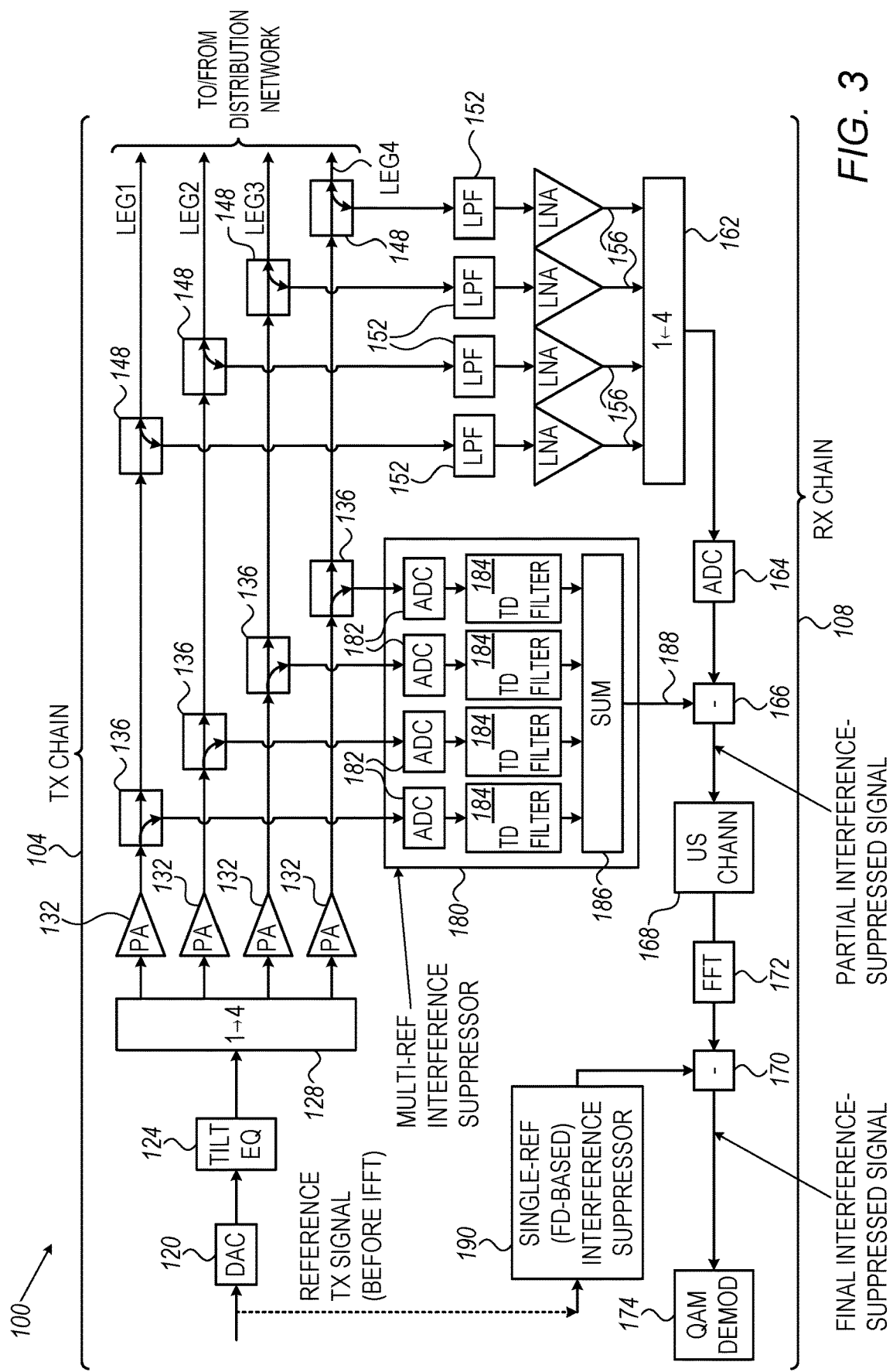
FIG. 3 is a block diagram that schematically illustrates a multi-leg node that includes interference suppression, in accordance with an embodiment that is described herein.

FIG. 3 is a block diagram that schematically illustrates a multi-leg node 100 that includes interference suppression, in accordance with an embodiment that is described herein. Multi-leg node 100 comprises a transceiver that comprises a TX chain 104 and a RX chain 108. A multi-leg configuration enables efficient transmission of the same data to multiple subscribers with minimal hardware duplication.

FIG. 3 depicts only the analog part of the TX chain starting with a DAC 120 that converts a downstream signal from a digital form to an analog form. An up-tilt equalizer 124 emphasizes high frequencies of the downstream signal to compensate for the channel response, and a splitter 128 that splits the downstream signal into four signal-copies that are amplified separately by four respective Power Amplifiers (PAs) 132. In alternative embodiments, splitter 128 splits the transmitted signal into any suitable number of signal-copies other than four.

The outputs of PAs 132 are sampled using respective TX couplers 136 and transmitted to the distribution network via respective RX couplers 148 and respective output legs denoted LEG1 . . . LEG4. Each of the legs typically comprises a Radio Frequency (RF) connector.

In the present context we assume that CMs 44 connected to LEG1 . . . LEG4 belong to a common DOCSIS service group as specified, for example, in the FDX DOCSIS 3.1 standard cited above. The legs serving a given service group transmit the same downstream signal, and receive respective upstream signals assigned to different time/frequency resources, i.e., mini-slots containing multiple subcarriers.

The above assumption typically does not hold for mini-slots assigned to collision-based messages such as request or initial ranging. Collisions may also occur on such mini-slots by CMs coupled to the same leg. Note that even though there are several physical legs, the underlying scheduling scheme assumes that time-frequency resources are shared between all CMs as if they were coupled to the same leg.

The common service group assumption is needed for combining the legs in the Rx path without the risk of a collision, i.e., transmission of CMs from different legs on the same mini-slots is not allowed (excluding transmissions that are collision-based by nature as described above).

Rx chain 108 receives upstream signals from LEG1 . . . LEG4 via respective RX couplers 148. The upstream signals are filtered using respective Low Pass Filters 152, amplified using respective Low Noise Amplifiers (LNAs) 156, and combined using a four-to-one combiner 162. In an alternative embodiment, the outputs of RX couplers 148 are first combined using four-to-one combiner 162, and then filtered and amplified using LPF 152 and LNA 156 or other suitable filter and amplifier. The combined upstream signal output by combiner 162 is sampled and converted by an ADC 164 into a digital upstream signal.

Rx chain 108 further comprises an upstream (US) channelizing module 168, a FFT module 172 and a QAM demodulator 174 that sequentially process the digital upstream signal to recover data sent from the CMs, similarly to US channelizing module 74, FFT module 76 and a QAM demodulator 78 of FIG. 1.

Multi-leg node 100 comprises a multi-ref interference suppressor 180 whose TX reference points are the outputs of PA 132, and a single-ref interference suppressor 190 whose TX reference point is drawn from the TX chain prior to DAC 120. The multi-ref interference suppressor receives a downstream signal sample from each PA 132 via the respective TX coupler 136, and samples and converts this downstream signal to a digital form using a respective ADC 182. In the embodiment of FIG. 3, multi-ref interference suppressor 180 comprises four digital TD filters 184, one TD filter per leg or ADC 182. Each TD filter comprises multiple TD coefficients configured so as to emulate the impulse response of the interference channel between the relevant PA output and the RX reference point at the output of ADC 164.

Each of TD filters 184 applies a convolution operation between its (previously estimated) TD coefficients and digital samples of the respective sampled PA output, which contains, in addition to the DS signal interfering components such as noise and distortion. An adder 186 sums the outputs of the four TD filters to produce a combined interference suppression signal 188. A subtraction module 166 subtracts combined interference suppression signal 188 from the signal output by ADC 164, to produce a partial interference-suppressed signal.

In alternative embodiments, the output of each TX coupler 136 is converted to a digital signal and split into multiple reference channels using an US channelizer (e.g., such as US channelizer 168.) In such embodiments, the multi-leg node comprises multiple interference suppressor modules 180 that each applies one channelization operation and multiple TD filtering operations to the multiple channels of the respective US channelizer. In these embodiments, subtraction module 166 is located after US channelizer 168 of the Rx path.

As noted above, single-ref interference suppressor 190 receives a TX reference signal from a selected TX reference point in the TX chain preceding DAC 120 (shown as a dotted line.) In the embodiment of FIG. 3, the TX reference point is configured before IFFT module 52, in which case single-ref interference suppressor 190 is implemented using a FD filter. In an alternative embodiment, the TX reference point is configured after IFFT module 52, in which case single-ref interference suppressor 190 is implemented using a TD filter.

Single-ref interference suppressor 190 processes its input to produce an interference suppression signal that a subtraction module 170 subtracts from the output of FFT module 172 to produce a final interference-suppressed signal at the input of FFT module 172. When single-ref interference suppressor 190 is implemented using a TD filter, the subtraction point is after FFT module 172. Single-ref interference suppressor 190 may comprise one or more elements similar to the elements of the digital part of the TX chain for compatibility between the selected TX and RX reference points. Single-ref interference suppressor 190 further comprises a digital filter (not shown) that can be implemented in the time domain or in the frequency domain as described above.

In some embodiments, the coupling output of each TX coupler 136 is split into multiple reference channels (as described above) and an FFT operation is applied per each of the reference channels of each leg. In such embodiments, the filtering operation of TD filter 184 is replaced with a filtering operation in the frequency domain, and the subtraction point is configured after FFT module 172. In another embodiment, node 100 combines both TD and FD filtering, which may result in a shorter TD filter.

Design Considerations for a Multi-Leg Node

Next we describe various design considerations for the architecture of multi-leg node 100. The RX chain may experience various interference types such as leakage and echoes of the transmitted signals. Other interference sources include thermal noise, quantization noise generated by ADCs 164 and 182, and by DAC 120, and nonlinear distortion caused mainly by PAs 132. Considerations for mitigating the various interference sources will be described in detail below.

Due to limited isolation, the outputs of PAs 132 may leak through RX couplers 148 into the RX chain and degrade the receiver performance. In addition, due to impedance mismatch, the downstream signal transmitted via each of the node legs may be reflected as an echo from the respective RF connector and/or by taps and other elements in the distribution network to which the leg connects. In general, the RX chain experiences an interference that is the sum of the individual interferences associated with the different legs.

Since PAs 132 transmit at a power level that is typically significantly higher than the typical receive level, the level of the interference is much higher than the received upstream signal, and therefore the dynamic range of the RX chain, e.g., of LNAs 156 and ADC 164, should be designed sufficiently high to accommodate that signal to interference power difference.

In the architecture of FIG. 3, multi-ref interference suppressor 180 accepts multiple TX reference signals from the outputs of respective PAs 132. This configuration allows suppressing interference caused by thermal noise, quantization noise of DAC 120, and nonlinear distortion caused by PAs 132. Note that such noise and nonlinear distortion effects are invisible to single-ref interference suppressor 190 because its TX reference point is drawn prior to DAC 120.

Although the noise and distortion reflections are much weaker than the reflections of the TX signal, and are also typically weaker than the upstream signals received at the RX chain via the node legs, noise and nonlinear distortion may still limit the Signal to Noise Ratio (SNR) that can be achieved at the RX chain. Suppressing noise and distortion is therefore required for achieving high spectral efficiency.

In the example of FIG. 3, multi-ref interference suppressor 180 samples the outputs of PAs 132 and provides a combined suppression signal 188 to be subtracted from the output of ADC 164, and therefore suppresses the downstream signal including undesired components such as quantization noise of DAC 120 and distortion generated within PA 132.

For a given leg (of LEG1 . . . LEG4) the same transfer function models the interference channel for the downstream signal output by the respective PA and the interference channel for the noise and distortion associated with that PA. Note that although the same downstream signal is transmitted via all the legs LEG1 . . . LEG4, each leg experiences different noise and distortion interference corresponding to a different interference channel. Thus, the noise and distortion interference channels for the different legs are typically modeled by different respective transfer functions and therefore they cannot be modeled by a combined channel (as can be done for the downstream signal interference channel.)

The above discussion implies that for suppressing the noise and distortion interference of the PAs, a dedicated suppression signal should be generated for each leg. In the embodiment of FIG. 3, this is implemented by using a separate TD filter 184 for each leg, as described above.

The level of noise and distortion interference is typically at least 30 dB lower than the respective downstream signal, and therefore, a reflected noise and distortion signal is received at a given leg at least 30 dB lower than the respective reflected downstream signal at that leg. This means that for achieving a certain interference residual level at the output of subtraction module 166, some of the TD coefficients of TD filters 184 may be neglected (e.g., zeroed) compared to the coefficients required for suppression of the downstream signal.

Figure 4A:
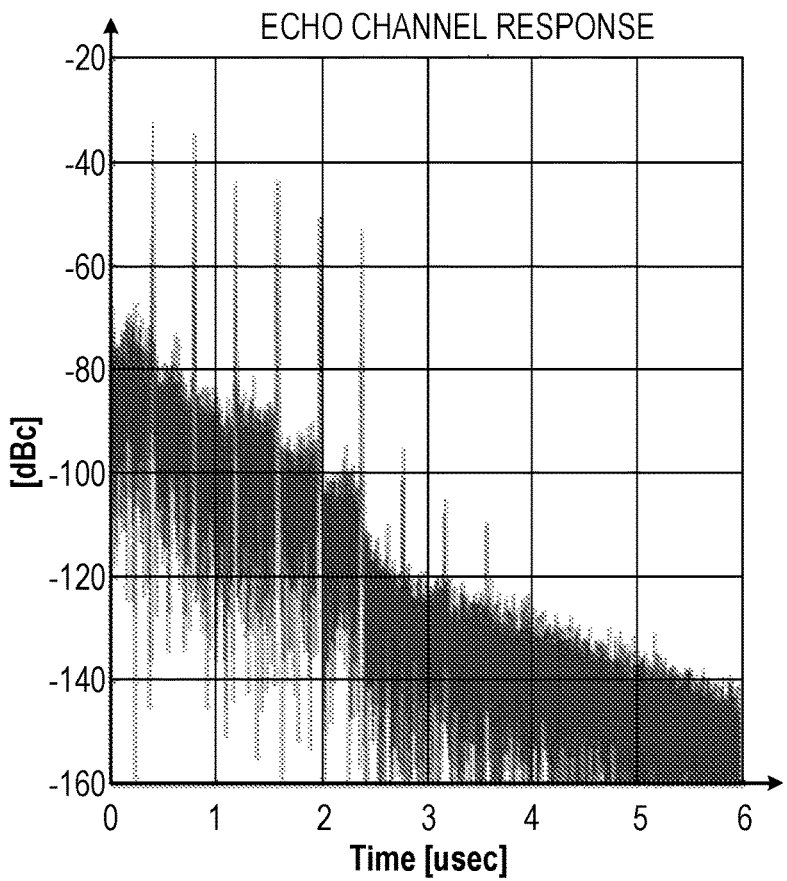
FIGS. 4A-4C are diagrams that schematically illustrate channel response functions used for echo suppression, in accordance with an embodiment that is described herein.
Figure 4B:
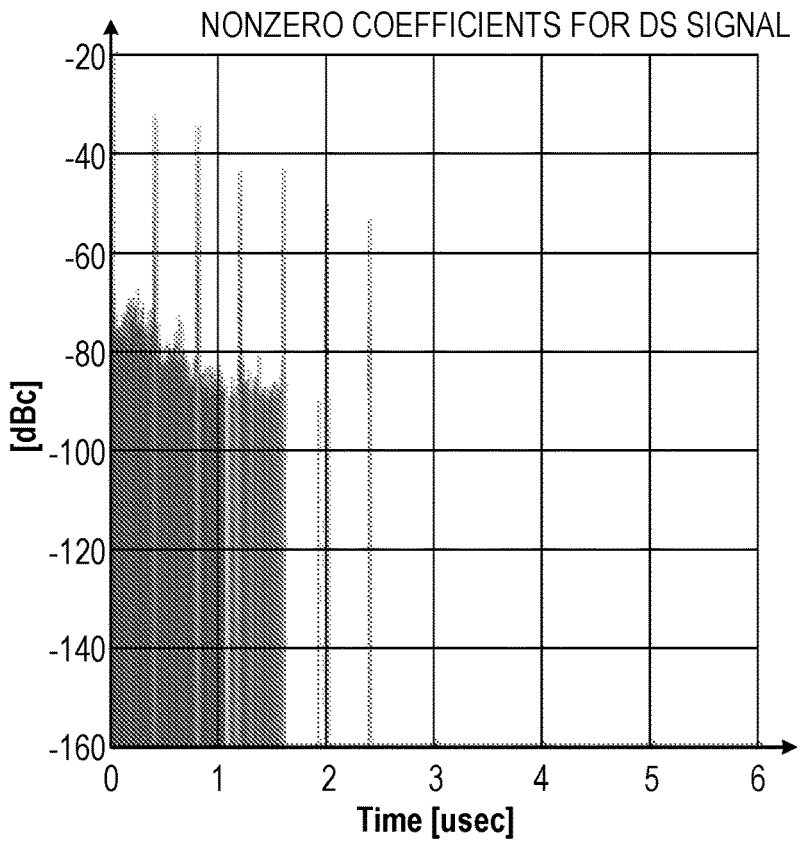
Figure 4C:
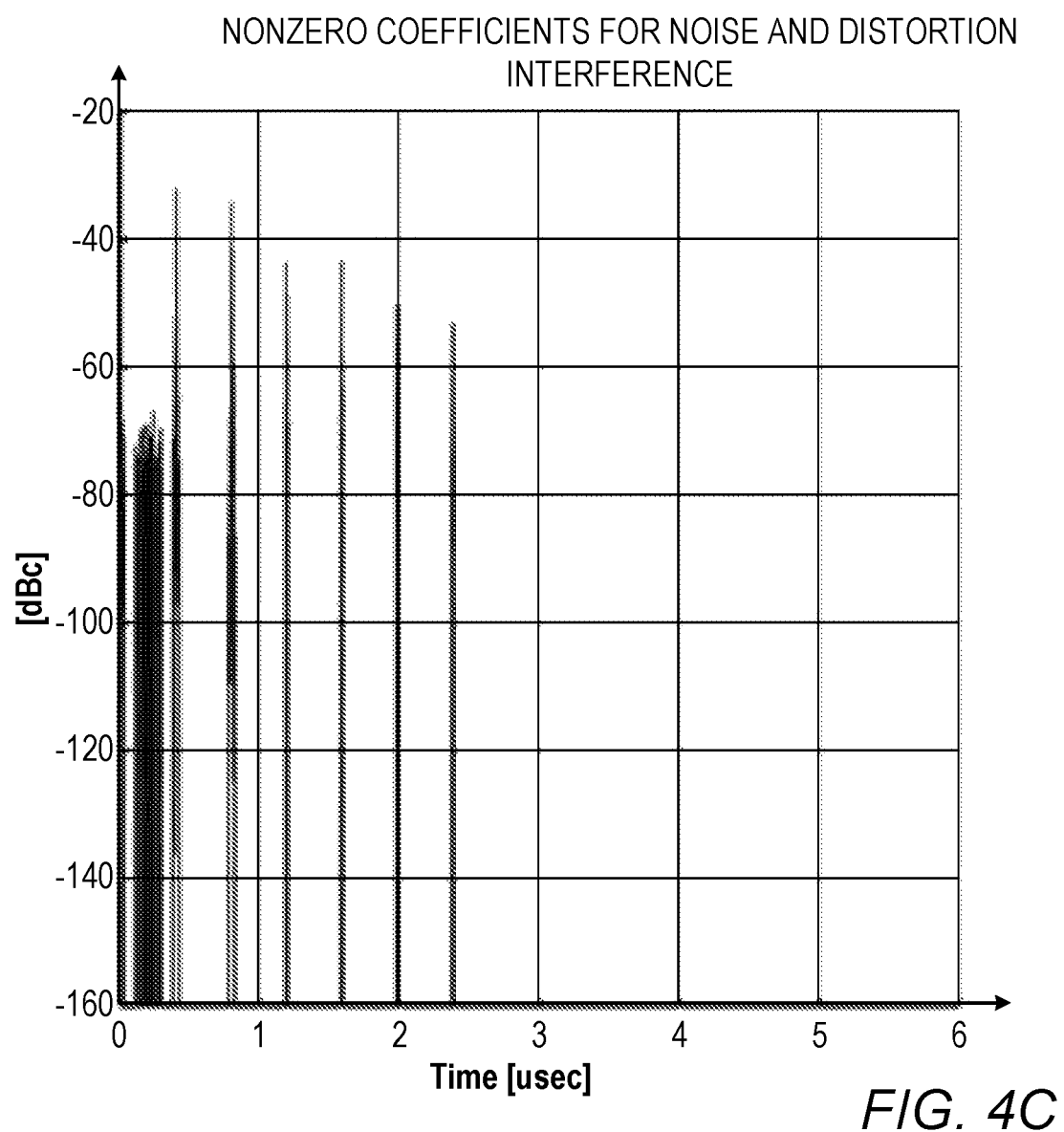

FIGS. 4A-4C are diagrams that schematically illustrate channel response functions used for echo suppression, in accordance with an embodiment that is described herein. The diagrams apply to an echo channel measured over one of LEG1 . . . LEG4 of a typical CATV N+0 coaxial cable network.

FIG. 4A depicts the full channel response up to 6 microseconds. The response value at time 0 corresponds to a reflection from the RF connector of the leg. The subsequent peaks at about 0.4 microseconds apart from one another correspond to six reflections from the distribution network. In some embodiments, only part of the entire channel response needs to be emulated for achieving a sufficient level of interference suppression.

FIG. 4B depicts a subset of the channel response corresponding mainly to echoes of the downstream signal, and FIG. 4C depicts a subset of the channel response corresponding mainly to distortion and noise interference. As seen in the diagrams, the number of nonzero coefficients in FIG. 4B is much larger than in FIG. 4C. Therefore, a filter based on the coefficients of FIG. 4B may be implemented more efficiently in the frequency domain, whereas a filter based on the coefficients of FIG. 4C may be implemented more efficiently in the time domain. Assume a total number Na of coefficients in FIG. 4A. The coefficients in FIG. 4B comprise a subset of the Nb most dominant coefficients of FIG. 4A, wherein Nb<Na. The coefficients in FIG. 4C comprise a subset of the Nc most dominant coefficients in FIG. 4B, wherein Nc<Nb.

The nonzero coefficients in FIGS. 4B and 4C are arranged in clusters, wherein at least some of the clusters contain a small number of nonzero coefficients. In an embodiment, only the nonzero coefficients are actually stored and multiplied by for filtering. Selecting the clusters can be done using any suitable method. For example, the clusters may be selected so that each cluster contains a predefined number M of consecutive coefficients, while minimizing the power (or amplitude) of the coefficients that are zeroed.

In some embodiments, single-ref interference suppressor 190 applies FD filtering, by applying FFT to the samples of the FD filter input, multiplying the FFT output by a frequency response of the interference channel derived, e.g., from the time domain coefficients of FIG. 4A, and applying IFFT to recover the filtered time domain output to be subtracted at the input of FFT module 172. In another embodiment, as depicted in FIG. 3, subtraction module 170 is positioned at the output of FFT module 172, and subtraction module 170 performs the subtraction in the frequency domain.

In some embodiments, single-ref interference suppressor 190 applies FD filtering, including conversion back to the time domain using IFFT, as described above, by applying the FFT operation over partially overlapping FFT blocks. The overlapping interval should be the same or longer than the length of the interference channel response. Handling FD filtering with overlapping FFT blocks can be implemented, for example, using the overlap-and-save method or the overlap-and-add method, as known in the art.

In some embodiments, multi-leg node 100 transmits and receives OFDM signals, e.g., in accordance with the FDX DOCSIS 3.1 standard cited above. When the overlapping upstream OFDM signals received by the RX chain and the OFDM downstream signal of the TX chain are synchronized, e.g., as described in FIG. 2, FFT block overlapping for the FD filtering is not required for the downstream signal interference suppression. Note that since noise and distortion interference may not have the structure of the OFDM signals, suppressing noise and distortion interference using FD filtering (e.g., using multi-ref interference suppressor 180) without overlapping may result in some residual interference.

The FDX DOCSIS 3.1 standard cited above supports a synchronized operation between downstream channels and overlapping upstream channels. For example, in DOCSIS full duplex, a DS channel may occupy the frequency range between 108 MHz and 300 MHz, whereas one US channel may occupy a frequency range between 108 MHz and 204 MHz and another US channel occupies the 204 MHz to 300 MHz range.

Based on the above described design considerations, the architecture of FIG. 3 comprises a dedicated TD filter 184 for each leg, wherein each TD filter comprising a small number of coefficients required for suppressing noise and distortion interference for this leg using a convolution operation. The TD filter may comprise coefficients for suppressing also a downstream transmission that interferes with the RX chain via leakage and reflections. The TD filter may be applied for the entire full duplex band, or for a selected sub-band of the full duplex band, e.g., for a single OFDM channel. In some embodiments, the TD filter is implemented in a clustered structure, storing only nonzero coefficients of the TD filter, and calculating the convolution by multiplying only the non-zero coefficients by respective input signal samples. In alternative embodiments, the TD filter can be replaced with an equivalent FD filter, as described above. The FD filter may be fully equivalent to the TD filter (in the case of using overlapping) or approximately equivalent to the TD filter (when overlapping is not applied).

The FD filtering operation of single-ref interference suppressor 190 is applied for suppressing the residual interference that remains after applying the multi-leg interference suppressor. The FD filtering is typically applied separately per upstream OFDM or OFDM multiple Access (OFDMA) channel. Alternatively, the FD filtering may be applied to the entire full duplex bandwidth, or to any other suitable sub-band of the full duplex channel, such as a downstream OFDM channel coinciding with one or more upstream OFDMA channels.

The configurations of transceiver 24, distribution network 40 and multi-leg node 100 shown in FIGS. 1 and 3 are example configurations, which are chosen purely for the sake of conceptual clarity. In alternative embodiments, any other suitable transceiver, distribution network and multi-leg node configurations can also be used.

Each of the pairs of transmitter 28 and receiver 32, and/or TX chain 104 and RX chain 108, may be integrated in a single device (e.g., on a single silicon die) within transceiver 24 and within multi-leg node 100, respectively. Alternatively, each of transmitter 28, receiver 32, TX chain 104 and RX chain 108 is implemented in a separate device. Further alternatively, any other suitable partition of the elements comprised in transceiver 24 and multi-leg node 100 into separate devices can also be used.

The different elements of transceiver 24 and multi-leg node 100 may be implemented using suitable hardware, such as in one or more Application-Specific Integrated Circuits (ASICs) or Field-Programmable Gate Arrays (FPGAs).

In some embodiments, some elements of transceiver 24 and multi-leg node 100, e.g., IFFT module 52 (and an IFFT module in TX chain 104 that is not shown), FFT modules 76 and 172, digital interference suppressor 84, multi-ref interference suppressor 180 and single-ref interference suppressor 190 can be implemented using software, or using a combination of hardware and software elements. Elements of digital transceiver 24 and multi-leg node 100 that are not mandatory for understanding of the disclosed techniques have been omitted from the figure for the sake of clarity.

In some embodiments, some of the functions of transceiver 24 and multi-leg node 100 may be implemented in a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The embodiments described above are given by way of example, and other suitable embodiments can also be used. For example, although the description above refers mainly to a transceiver in a headend of a cable TV system, the disclosed techniques apply similarly to other suitable content distribution systems and/or to a transceiver operating at the subscriber side.

Although the embodiments described herein mainly address interference suppression in communication systems based on the DOCSIS 3.1 full duplex specifications, the methods and systems described herein can also be used in other applications, such as in applying other communication technologies, e.g., Digital Subscriber Line (xDSL), Ethernet, Satellite communication, and 5G mobile systems.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for communication, comprising:
a transmission chain, configured to transmit a transmitted signal;
an interference suppressor, configured to produce one or more suppression signals, by filtering one or more respective reference signals drawn from the transmission chain, wherein at least a given reference signal of the one or more reference signals is filtered in a frequency domain; and
a reception chain configured to:
receive a received signal distorted by an interference signal comprising at least an attenuated and delayed replica of the transmitted signal, wherein the transmitted signal and the received signal are (i) synchronized in time and (ii) each comprises one or more subcarriers selected from a common subcarrier-resource;
process the received signal up to one or more selected points along the reception chain, and respectively subtract the one or more suppression signals from the received signal at the selected points to produce an interference-suppressed signal; and
recover data carried in the received signal from the interference-suppressed signal.

2. The apparatus according to claim 1, wherein the transmission chain comprises a digital TX sub-chain followed by an analog TX sub-chain, wherein each of the one or more reference signals is drawn from the digital TX sub-chain or from the analog TX sub-chain.

3. The apparatus according to claim 1, wherein the reception chain comprises an analog RX sub-chain followed by a digital RX sub-chain, wherein each of the selected points along the reception chain is comprised in the analog RX sub-chain or in the digital RX sub-chain.

4. The apparatus according to claim 1, wherein the transmission chain and the reception chain are configured to operate in a full duplex mode.

5. The apparatus according to claim 1, wherein the interference suppressor is configured to generate an analog suppression signal based on a digital reference signal drawn from a digital sub-chain of the transmission chain.

6. The apparatus according to claim 1, wherein the interference suppressor is configured to generate, using time-domain filtering, an analog suppression signal for suppressing at least noise or distortion interference, and to generate, using frequency-domain filtering, a digital suppression signal for suppressing interference caused by leakage or reflections of the transmitted signal.

7. The apparatus according to claim 1, wherein the transmission chain is configured to split the transmitted signal into multiple signal-copies for transmission over multiple respective ports, wherein the reception chain is configured to combine multiple reception signals received from the respective ports, and wherein the interference suppressor is configured to generate a suppression signal based on respective samples of the multiple signal-copies.

8. The apparatus according to claim 7, wherein the interference suppressor is configured to generate for the multiple signal-copies multiple respective temporary suppression signals, and to generate the suppression signal by summing the multiple temporary suppression signals.

9. The apparatus according to claim 8, wherein the interference suppressor is configured to generate the temporary suppression signals by applying to each of the signal-copies a time-domain or a frequency-domain filtering operation.

10. The apparatus according to claim 8, wherein the interference suppressor is configured to generate the suppression signal for reducing a level of at least noise or distortion present at the multiple signal-copies.

11. The apparatus according to claim 1, wherein the interference suppressor is configured to subtract a first suppression signal from the received signal at a first point of the reception chain, and to subtract a second suppression signal at a second different point of the reception chain for reducing a residual interference signal present in the received signal after subtracting the first suppression signal at the first point.

12. The apparatus according to claim 1, wherein the transmission chain and the reception chain are configured to operate in accordance with a DOCSIS full duplex specification.

13. The apparatus according to claim 1, wherein the transmission chain is configured to transmit the transmitted signal over a coaxial-based network of a Cable TV (CATV)

system, and the reception chain is configured to receive the received signal over the coaxial-based network of a Cable TV (CATV) system.

\* \* \* \* \*